United States Patent
Clark et al.

(10) Patent No.: US 10,679,668 B2
(45) Date of Patent: Jun. 9, 2020

(54) SYSTEMS AND METHODS FOR EDITING VIDEOS

(71) Applicant: GoPro, Inc., San Mateo, CA (US)

(72) Inventors: Christopher J. Clark, San Francisco, CA (US); Ingrid A. Cotoros, Hillsborough, CA (US); Jessica Bonner, San Francisco, CA (US)

(73) Assignee: GoPro, Inc., San Mateo, CA (US)

(*) Notice: Subject to any disclaimer, the term of this patent is extended or adjusted under 35 U.S.C. 154(b) by 0 days.

(21) Appl. No.: 16/551,357

(22) Filed: Aug. 26, 2019

(65) Prior Publication Data

US 2020/0075057 A1 Mar. 5, 2020

Related U.S. Application Data

(60) Provisional application No. 62/725,477, filed on Aug. 31, 2018.

(51) Int. Cl.
*G11B 27/02* (2006.01)
*H04N 13/106* (2018.01)

(52) U.S. Cl.
CPC ........... *G11B 27/02* (2013.01); *H04N 13/106* (2018.05)

(58) Field of Classification Search
CPC .............................. G11B 27/02; H04N 13/106
See application file for complete search history.

(56) References Cited

U.S. PATENT DOCUMENTS

| | | | |
|---|---|---|---|
| 2005/0086681 A1* | 4/2005 | Ebihara | G11B 27/02 725/1 |
| 2014/0254682 A1* | 9/2014 | Chen | H04N 19/597 375/240.16 |
| 2016/0241836 A1* | 8/2016 | Cole | H04N 13/194 |
| 2019/0313075 A1* | 10/2019 | Moss | H04N 13/239 |

* cited by examiner

*Primary Examiner* — Thai Q Tran
*Assistant Examiner* — Sunghyoun Park
(74) *Attorney, Agent, or Firm* — Esplin & Associates, PC

(57) ABSTRACT

Spherical video content may have a progress length and include spherical video frames that define visual content viewable from a point of view as a function of progress through the progress length. Edits for the spherical video content may be used to generate an edit tree. The edit tree may include nodes corresponding to the edits and edges connecting different nodes. An edit of the spherical video content may be generated based on the edit tree.

20 Claims, 10 Drawing Sheets

System 10

SYSTEMS AND METHODS FOR EDITING VIDEOS

FIELD

This disclosure relates to providing hierarchical editing options for spherical videos based on an edit tree.

BACKGROUND

Making edits to video content (e.g., spherical video content) may be complicated and time consuming. Arranging or modifying edits to video content may similarly be complicated and time consuming. For example, it may be difficult to identify particular edits that have been made to video content and how changing certain edits may affect the editing of the video content.

SUMMARY

This disclosure relates to hierarchical editing options for spherical videos. Video information defining spherical video content may be obtained. The spherical video content may have a progress length. The spherical video content may include spherical video frames that define visual content viewable from a point of view as a function of progress through the progress length. A set of edits for the spherical video content may be obtained. The set of edits may include a first edit, a second edit, and/or other edits. The second edit may follow the first edit in the set of edits. An edit tree for the spherical video content may be generated based on the set of edits and/or other information. The edit tree may include a first node corresponding to the first edit, a second node corresponding to the second edit, other nodes corresponding to other edits, an edge connecting the first node and the second node, and/or other edges connecting other nodes. An edit of the spherical video content may be generated based on the edit tree and/or other information.

A system that provides hierarchical editing options for spherical videos may include one or more electronic storage, processor and/or other components. The electronic storage may store video information defining video content (e.g., spherical video content), information relating to edits for video content, information relating to edit trees, information relating to video edits of video content, and/or other information.

Video content may refer to media content that may be consumed as one or more videos. Video content may include one or more videos stored in one or more formats/containers, and/or other video content. Video content may have a progress length. Video content may include video frames that define visual content viewable as a function of progress through the progress length of the video content. Visual content of the video content may be included within video frames of the video content. Video content may include spherical video content and/or other video content. Spherical video content may include spherical video frames that define visual content viewable from a point of view as a function of progress through the progress length of the spherical video content. The spherical video content may be captured by one or more image capture devices. In some implementations, the video content (e.g., spherical video content) may be consumed as virtual reality content.

The processor(s) may be configured by machine-readable instructions. Executing the machine-readable instructions may cause the processor(s) to facilitate providing hierarchical editing options for spherical videos. The machine-readable instructions may include one or more computer program components. The computer program components may include one or more of a video information component, an edit component, an edit tree component, a video edit component, and/or other computer program components.

The video information component may be configured to obtain video information and/or other information. The video information may define video content (e.g., spherical video content). The video information component may obtain video information from one or more storage locations. The video information component may obtain video information during acquisition of the video content and/or after acquisition of the video content by one or more image sensors/image capture devices.

The edit component may be configured to obtain one or more sets of edits for the video content (e.g., spherical video content) and/or other information. A set of edits may include a first edit, a second edit, and/or other edits. The second edit may follow the first edit in the set of edits. In some implementations, one or more of the edits may define one or more trajectory of viewing directions for the video content (e.g., spherical video content). For example, the first edit may define a first trajectory of viewing directions for the spherical video content for a first duration within the progress length, and the second edit may define a second trajectory of viewing directions for the spherical video content for a second duration within the progress length. The second duration may follow the first duration within the progress length.

In some implementations, an end of a trajectory may be the same as a beginning of a subsequent trajectory. For example, the first trajectory of viewing directions may terminate at a first viewing direction, and the second trajectory of viewing directions may begin at the first viewing direction.

In some implementations, one or more of the edits may be obtained based on detection of a verbal edit command during a presentation of the video content (e.g., spherical video content). For example, the set of edits may include a third edit. The third edit may be obtained based on detection of a verbal edit command during a presentation of the video content. Different types of verbal edit commands may be detected. For example, detectable verbal edit commands may include a projection command, a playback speed command, a playback direction command, a marker command, and/or other commands.

The projection command may specify one or more projections with which at least a portion of the video content is to be presented. The playback speed command may specify one or more perceived speeds with which at least a portion of the video content is to be presented. The playback direction command may specify a forward direction and/or a reverse direction with which at least a portion of the video content is to be presented. The marker command may specify one or more markers to be placed at one or more moments within the progress length. The moment(s) may be determined based on the detection of the marker command during the presentation of the video content.

The edit tree component may be configured to generate an edit tree for the video content (e.g., spherical video content) based on the set(s) of edits and/or other information. The edit tree may include a first node corresponding to the first edit, a second node corresponding to the second edit, and/or other nodes corresponding to other edits. The edit tree may include an edge connecting the first node and the second node, and/or other edges connecting other nodes. One or more edits corresponding to one or more nodes may be changed based on other change(s) in the edit tree, such as based on one or more change to a node and/or an edge in the edit tree. For instance, based on a change to the first trajectory of viewing direction (the first edit corresponding to the first node) to terminate at a second viewing direction, the second trajectory of viewing directions (the second edit corresponding to the second node) may be changed based on the second viewing direction and/or other information.

For example, the second trajectory of viewing directions may be changed based on the second viewing direction to begin at the second viewing direction. As another example, the second trajectory of viewing directions may include a portion in which the second trajectory of viewing direction is following a target within the video content from a third viewing direction. The second trajectory of viewing directions may be changed based on the second viewing direction and the third viewing direction to include a path from the second viewing direction to the third viewing direction.

In some implementations, one or more sets of edit options for the video content may be provided following a node in the edit tree. For example, a set of edit options may be provided following the second node and/or other nodes. The set of edit options may include a first trajectory option, a second trajectory option, and/or other options. The first trajectory option may define a third trajectory of viewing directions for the spherical video content for a third duration within the progress length. The second trajectory option may define a fourth trajectory of viewing directions for the spherical video content for the third duration within the progress length. The third trajectory of viewing directions may be different from the fourth trajectory of viewing direction. The third duration may follow the second duration within the progress length.

In some implementations, the edit tree may be accessible through one or more user interfaces. The user interface(s) may enable one or more changes to the nodes and/or edges within the edit tree. For example, the user interface(s) may enable one or more changes to first node, the second node, and/or the edge connecting the first node and the second node.

The video edit component may be configured to generate one or more video edits of the video content (e.g., spherical video content) based on the edit tree and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
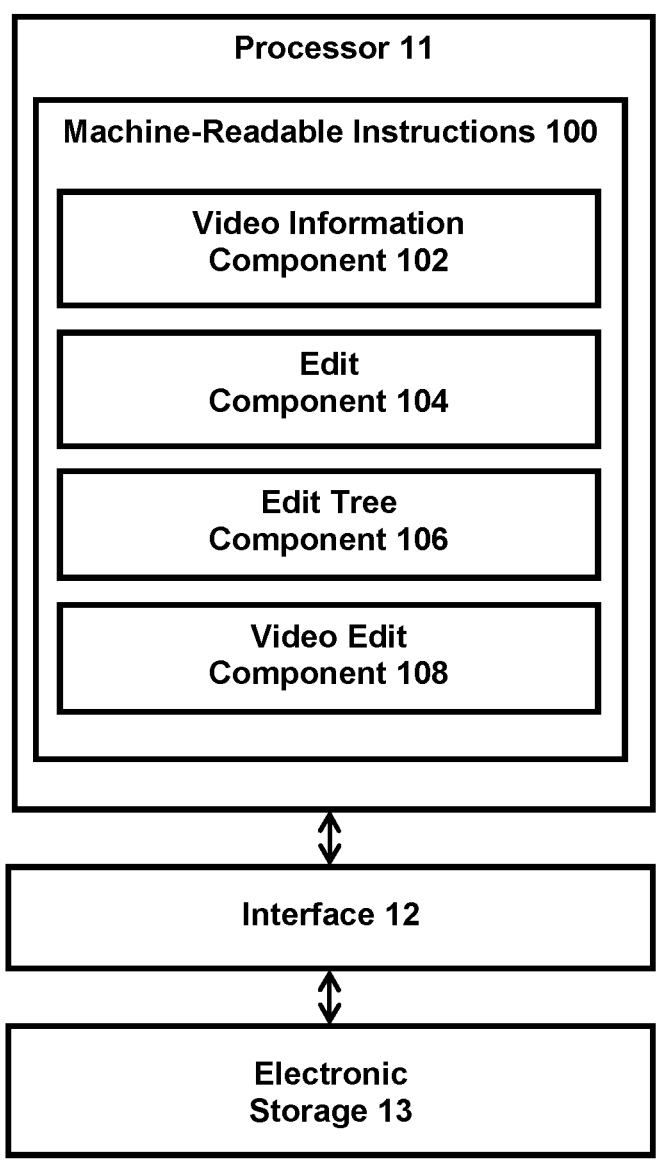
FIG. 1 illustrates a system that provides hierarchical editing options for spherical videos.

FIG. 1 illustrates a system 10 for providing hierarchical editing options for spherical videos. The system 10 may include one or more of a processor 11, an interface 12 (e.g., bus, wireless interface), an electronic storage 13, and/or other components. Video information defining spherical video content may be obtained by the processor 11. The spherical video content may have a progress length. The spherical video content may include spherical video frames that define visual content viewable from a point of view as a function of progress through the progress length. A set of edits for the spherical video content may be obtained. The set of edits may include a first edit, a second edit, and/or other edits. The second edit may follow the first edit in the set of edits. An edit tree for the spherical video content may be generated based on the set of edits and/or other information. The edit tree may include a first node corresponding to the first edit, a second node corresponding to the second edit, other nodes corresponding to other edits, an edge connecting the first node and the second node, and/or other edges connecting other nodes. An edit of the spherical video content may be generated based on the edit tree and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to video information, information relating to video content (e.g., spherical video content), information relating to edits for video content, information relating to edit trees, information relating to video edits of video content, and/or other information.

Video content may refer to media content that may be consumed as one or more videos/video clips. Video content may include one or more videos/video clips stored in one or more formats/containers, and/or other video content. A format may refer to one or more ways in which the information defining video content is arranged/laid out (e.g., file format). A container may refer to one or more ways in which information defining video content is arranged/laid out in association with other information (e.g., wrapper format). Video content may include a video clip captured by an image capture device, multiple video clips captured by an image capture device, and/or multiple video clips captured by different image capture devices. Video content may include multiple video clips captured at the same time and/or multiple video clips captured at different times. Video content may include a video clip processed by an image/video application, multiple video clips processed by an image/video application, and/or multiple video clips processed by different image/video applications.

Video content may have a progress length. A progress length may be defined in terms of time durations and/or frame numbers. For example, video content may include a video having a time duration of 60 seconds. Video content may include a video having 1800 video frames. Video content having 1800 video frames may have a play time duration of 60 seconds when viewed at 30 frames/second. Other progress lengths, time durations, and frame numbers are contemplated.

Video content may define visual content viewable as a function of progress through the progress length of the video content. Visual content of the video content may be included within video frames of the video content. That is, video content may include video frames that define visual content of the video content. In some implementations, video content may include one or more spherical video content, virtual reality content, and/or other video content. Spherical video content and/or virtual reality content may define visual content viewable from a point of view as a function of progress through the progress length of the spherical video/virtual reality content. Spherical video content may include spherical video frames that define visual content viewable from a point of view as a function of progress through the progress length of the spherical video content.

Spherical video content may refer to a video capture of multiple views from a location. Spherical video content may include a full spherical video capture (360 degrees of capture, including opposite poles) or a partial spherical video capture (less than 360 degrees of capture). Spherical video content may be captured through the use of one or more image capture devices (e.g., cameras, image sensors) to capture images/videos from a location. Spherical video content may be generated based on light received within a field of view of a single image sensor or within fields of view of multiple image sensors during a capture period. For example, multiple images/videos captured by multiple cameras/image sensors may be combined/stitched together to form the spherical video content. The field of view of camera(s)/image sensor(s) may be moved/rotated (e.g., via movement/rotation of optical element(s), such as lens, of the image sensor(s)) to capture multiple images/videos from a location, which may be combined/stitched together to form the spherical video content.

Visual content of the spherical video content may be included within spherical video frames of the spherical video content. A spherical video frame may include a spherical image of the spherical video content at a moment within the progress length of the spherical video content. For example, multiple images captured by multiple cameras/images sensors at a moment in time may be combined/stitched together to form a spherical video frame for the moment in time. A spherical video frame may include a full spherical image capture (360 degrees of capture, including opposite poles) or a particular spherical image capture (less than 360 degrees of capture). A spherical image (e.g., spherical video frame) may be comprised of multiple sub-images (sub-frames). Sub-images may be generated by a single image sensor (e.g., at different times as the field of view of the image sensor is rotated) or by multiple image sensors (e.g., individual sub-images for a moment in time captured by individual image sensors and combined/stitched together to form the spherical image).

In some implementations, spherical video content may be stored with a 5.2K resolution. Using a 5.2K spherical video content may enable viewing windows (e.g., directed to a portion of a spherical video frame) for the spherical video content with resolution close to 1080p. In some implementations, spherical video content may include 12-bit video frames. In some implementations, spherical video content may be consumed as virtual reality content.

Virtual reality content may refer to content (e.g., spherical video content) that may be consumed via virtual reality experience. Virtual reality content may associate different directions within the virtual reality content with different viewing directions, and a user may view a particular direction within the virtual reality content by looking in a particular direction. For example, a user may use a virtual reality headset to change the user's direction of view. The user's direction of view may correspond to a particular direction of view within the virtual reality content. For example, a forward-looking direction of view for a user may correspond to a forward direction of view within the virtual reality content.

Spherical video content and/or virtual reality content may have been captured at one or more locations. For example, spherical video content and/or virtual reality content may have been captured from a stationary position (e.g., a seat in a stadium). Spherical video content and/or virtual reality content may have been captured from a moving position (e.g., a moving bike). Spherical video content and/or virtual reality content may include video capture from a path taken by the capturing device(s) in the moving position. For example, spherical video content and/or virtual reality content may include video capture from a person walking around in a music festival.

Figure 3:
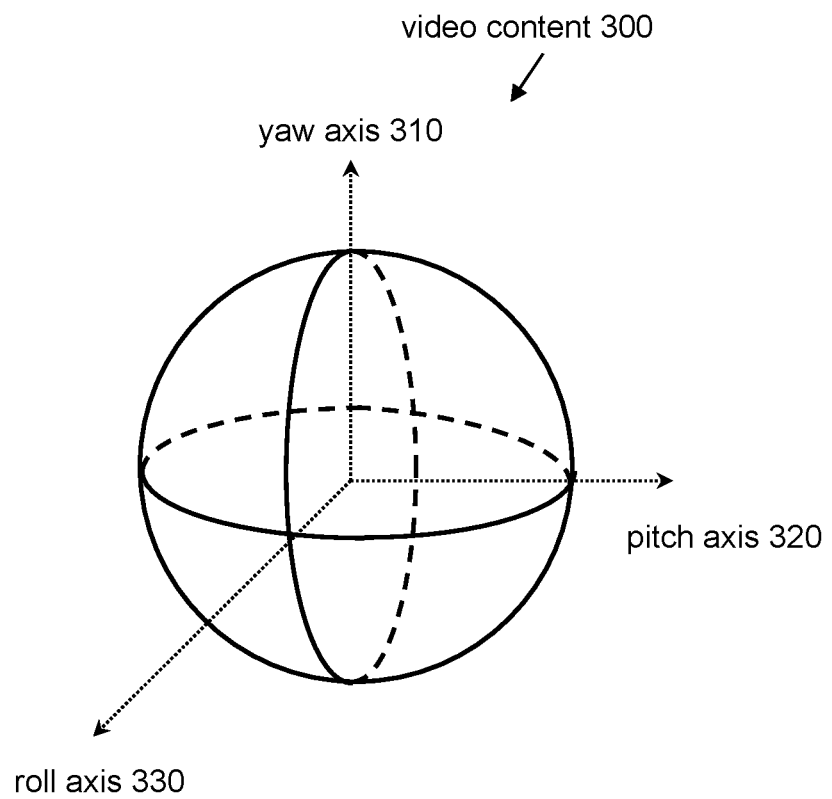
FIG. 3 illustrates an example spherical video content.

FIG. 3 illustrates an example video content 300 defined by video information. The video content 300 may include spherical video content. The video content 300 may define visual content viewable from a point of view (e.g., center of sphere) as a function of progress through the progress length of the video content 300. FIG. 3 illustrates example rotational axes for the video content 300. Rotational axes for the video content 300 may include a yaw axis 310, a pitch axis 320, a roll axis 330, and/or other axes. Rotations about one or more of the yaw axis 310, the pitch axis 320, the roll axis 330, and/or other axes may define viewing directions/viewing window for the video content 300.

For example, a 0-degree rotation of the video content 300 around the yaw axis 310 may correspond to a front viewing direction. A 90-degree rotation of the video content 300 around the yaw axis 310 may correspond to a right viewing direction. A 180-degree rotation of the video content 300 around the yaw axis 310 may correspond to a back viewing direction. A −90-degree rotation of the video content 300 around the yaw axis 310 may correspond to a left viewing direction.

A 0-degree rotation of the video content 300 around the pitch axis 320 may correspond to a viewing direction that is level with respect to horizon. A 45-degree rotation of the video content 300 around the pitch axis 320 may correspond to a viewing direction that is pitched up with respect to horizon by 45-degrees. A 90-degree rotation of the video content 300 around the pitch axis 320 may correspond to a viewing direction that is pitched up with respect to horizon by 90-degrees (looking up). A −45-degree rotation of the video content 300 around the pitch axis 320 may correspond to a viewing direction that is pitched down with respect to horizon by 45-degrees. A −90-degree rotation of the video content 300 around the pitch axis 320 may correspond to a viewing direction that is pitched down with respect to horizon by 90-degrees (looking down).

A 0-degree rotation of the video content 300 around the roll axis 330 may correspond to a viewing direction that is upright. A 90-degree rotation of the video content 300 around the roll axis 330 may correspond to a viewing direction that is rotated to the right by 90 degrees. A −90-degree rotation of the video content 300 around the roll axis 330 may correspond to a viewing direction that is rotated to the left by 90-degrees. Other rotations and viewing directions are contemplated.

A playback of video content (e.g., the video content 300) may include presentation of one or more portions of the video content on one or more displays based on a viewing window and/or other information. The viewing window may define extents of the visual content viewable on one or more displays as the function of progress through the progress length of the video content. The viewing window may define extents of the visual content presented on the display(s) as the function of progress through the progress length of the video content. For spherical video content, the viewing window may define extents of the visual content viewable from the point of view as the function of progress through the progress length of the spherical video content.

The viewing window may be characterized by viewing directions, viewing sizes (e.g., viewing zoom, viewing magnification), viewing rotations, and/or other information. A viewing direction may define a direction of view for video content. A viewing direction may define the angle/visual portion of the video content at which the viewing window is directed. A viewing direction may define a direction of view for the video content selected by a user, defined by instructions for viewing the video content, and/or determined based on other information about viewing the video content as a function of progress through the progress length of the video content (e.g., director track specifying viewing direction to be presented during playback as a function of progress through the progress length of the video content). For spherical video content, a viewing direction may define a direction of view from the point of view from which the visual content is defined. Viewing directions for the video content may be characterized by rotations around the yaw axis 310, the pitch axis 320, the roll axis 330, and/or other axes. For example, a viewing direction of a 0-degree rotation of the video content around a yaw axis (e.g., the yaw axis 310) and a 0-degree rotation of the video content around a pitch axis (e.g., the pitch axis 320) may correspond to a front viewing direction (the viewing window is directed to a forward portion of the visual content captured within the spherical video content).

Figure 4:
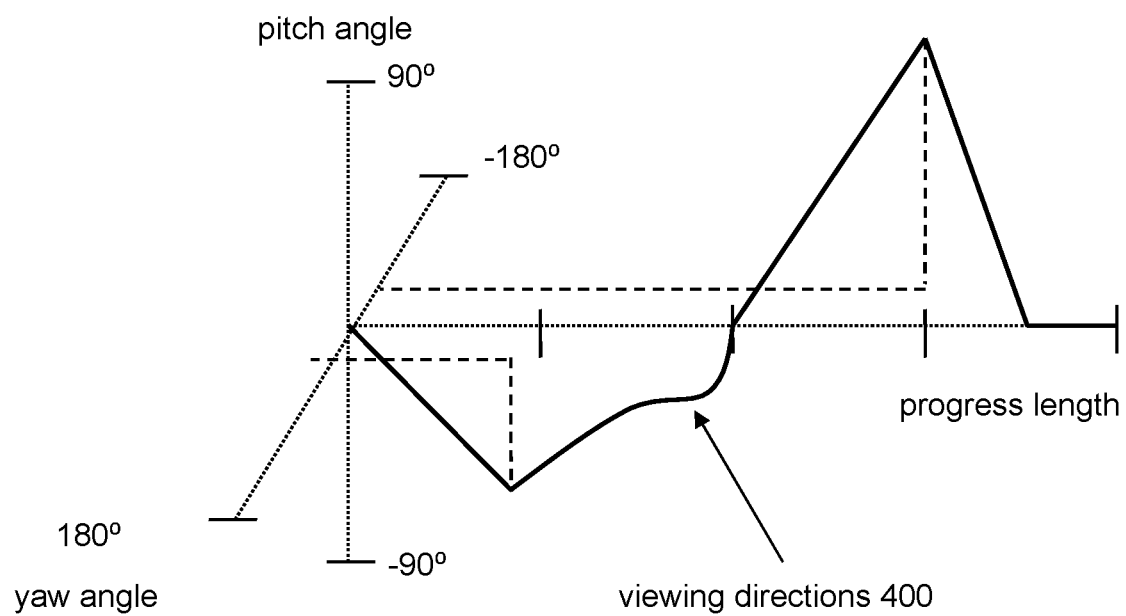
FIG. 4 illustrates example viewing directions for spherical video content.

For example, FIG. 4 illustrates example changes in viewing directions 400 (e.g., selected by a user for video content, specified by a director's track) as a function of progress through the progress length of the video content. The viewing directions 400 may change as a function of progress through the progress length of the video content. For example, at 0% progress mark, the viewing directions 400 may correspond to a zero-degree yaw angle and a zero-degree pitch angle. At 25% progress mark, the viewing directions 400 may correspond to a positive yaw angle and a negative pitch angle. At 50% progress mark, the viewing directions 400 may correspond to a zero-degree yaw angle and a zero-degree pitch angle. At 75% progress mark, the viewing directions 400 may correspond to a negative yaw angle and a positive pitch angle. At 87.5% progress mark, the viewing directions 400 may correspond to a zero-degree yaw angle and a zero-degree pitch angle. Other viewing directions are contemplated.

A viewing size may define a size (e.g., size, magnification, viewing angle) of viewable extents of visual content within the video content. A viewing size may define the dimensions of the viewing window. A viewing size may define a size of viewable extents of visual content within the video content selected by a user, defined by instructions for viewing the video content, and/or determined based on other information about viewing the video content as a function of progress through the progress length of the video content (e.g., director track specifying viewing size to be presented as a function of progress through the progress length of the video content). In some implementations, a viewing size may define different shapes of viewable extents. For example, a viewing window may be shaped as a rectangle, a triangle, a circle, and/or other shapes.

Figures 5A, 5B:
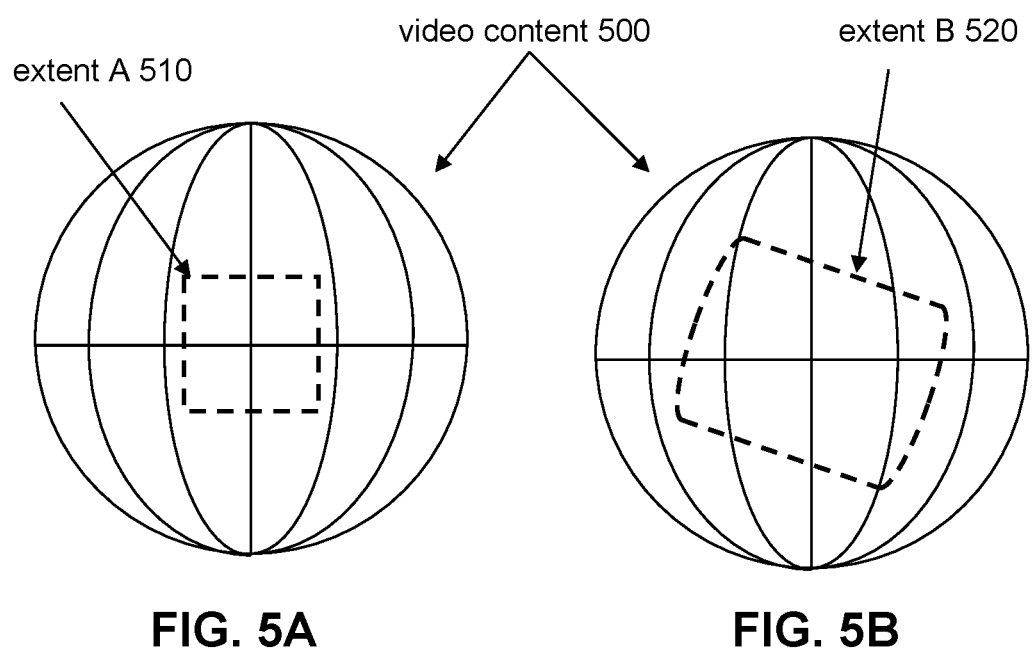
FIGS. 5A-5B illustrate example extents of spherical video content.

FIGS. 5A-5B illustrate examples of extents for video content 500. In FIG. 5A, the size of the viewable extent of the video content 500 may correspond to the size of extent A 500. In FIG. 5B, the size of viewable extent of the video content 500 may correspond to the size of extent B 510. Viewable extent of the video content 500 in FIG. 5A may be smaller than viewable extent of the video content 500 in FIG. 5B. Other viewing sizes are contemplated.

A viewing rotation may define a rotation of the viewing window. A viewing rotation may define one or more rotations of the viewing window about one of more axis. A viewing rotation may define a rotation of the viewing window selected by a user, defined by instructions for viewing the video content, and/or determined based on other information about viewing the video content as a function of progress through the progress length of the video content (e.g., director track specifying viewing rotation to be used as a function of progress through the progress length of the video content). For example, a viewing rotation of a viewing window having a rectangular shape may determine whether the rectangular viewing window is to be positioned in a portrait orientation (e.g., for a portrait view of the video content), in a landscape orientation (e.g., for a landscape view of the video content), and/or other orientation with respect to the visual content of the video content.

FIGS. 5A-5B illustrate examples of extents for video content 500. In FIG. 5A, the size of the viewable extent of the video content 500 may correspond to the size of extent A 500. In FIG. 5B, the size of viewable extent of the video content 500 may correspond to the size of extent B 510. Viewable extent of the video content 500 in FIG. 5A may be smaller than viewable extent of the video content 500 in FIG. 5B. The viewable extent of the video content 500 in FIG. 5B may be more tilted with respect to the video content 500 than viewable extent of the video content 500 in FIG. 5A. Other viewing sizes and viewing rotations are contemplated.

Referring back to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate providing hierarchical editing options for spherical videos. The machine-readable instructions 100 may include one or more computer program components. The machine-readable instructions 100 may include one or more of a video information component 102, an edit component 104, an edit tree component 106, a video edit component 108, and/or other computer program components.

The video information component 102 may be configured to obtain video information defining one or more video content (e.g., spherical video content) and/or other information. Obtaining video information may include one or more of accessing, acquiring, analyzing, determining, examining, identifying, loading, locating, opening, receiving, retrieving, reviewing, storing, and/or otherwise obtaining the video information. The video information component 102 may obtain video information from one or more locations. For example, the video information component 102 may obtain video information from a storage location, such as the electronic storage 13, electronic storage of information and/or signals generated by one or more image sensors, electronic storage of a device accessible via a network, and/or other locations. The video information component 102 may obtain video information from one or more hardware components (e.g., an image sensor) and/or one or more software components (e.g., software running on a computing device).

The video information component 102 may be configured to obtain video information defining one or more video content during acquisition of the video content and/or after acquisition of the video content by one or more image sensors/image capture devices. For example, the video information component 102 may obtain video information defining a video while the video is being captured by one or more image sensors/image capture devices. The video information component 102 may obtain video information defining a video after the video has been captured and stored in memory (e.g., the electronic storage 13).

In some implementations, the video information may be obtained based on user interaction with a user interface/application (e.g., video editing application), and/or other information. For example, a user interface/application may provide option(s) for a user to select one or more video content in which video edits are to be generated. The video information defining the video content may be obtained based on the user's selection of the video content through the user interface/video application.

The edit component 104 may be configured to obtain one or more sets of edits for the video content (e.g., spherical video content) and/or other information. Obtaining a set of edits may include one or more of accessing, acquiring, analyzing, determining, examining, identifying, loading, locating, opening, receiving, retrieving, reviewing, storing, and/or otherwise obtaining the set of edits. The edit component 104 may obtain a set of edits from one or more locations. For example, the edit component 104 may obtain a set of edits from a storage location, such as the electronic storage 13, electronic storage of information and/or signals generated by one or more image sensors, electronic storage of a device accessible via a network, and/or other locations. The edit component 104 may obtain a set of edits from one or more hardware components (e.g., an image capture device) and/or one or more software components (e.g., software running on a computing device).

In some implementations, a set of edits for the video content may be obtained based on user interaction with a user interface/application (e.g., video editing application), and/or other information. For example, a user interface/application may provide option(s) for a user to select one or more edits using which one or more video edits are to be generated. The set of edits for the video content may be obtained based on the user's selection of the edit(s) through the user interface/video application.

A set of edits may include one or more edits. For example, a set of edits may include a first edit, a second edit, and/or other edits. The second edit may follow the first edit in the set of edits. That is, the second edit may be subsequent to the first edit in the set of edits. The second edit following the first edit may include the second edit being applied to the video content after the application of the first edit to the video content. An edit may refer to a change to the video content. An edit may change the video content at one or more moments (e.g., point(s) of time, duration(s)) within the progress length of the video content or for the entire progress length of the video content. An edit may change the entire visual content (e.g., entire spherical frame) of the video content or one or more portions of the visual content (e.g., portion(s) of spherical frame). An edit may change one or more visual aspects and/or audio aspects of the video content.

For example, an edit may define which portions of visual content of the video content to be presented on playback (e.g., defining and/or changing viewing window, viewing directions, viewing sizes, viewing rotations), which portions of progress length of the video content to be presented on playback (e.g., selection of particular moments to be presented), ordering of portions of progress length of the video content to be presented on playback (e.g., ordering of particular moments to be presented), visual effects (e.g., changes in visual characteristics of the video content), audio effects (e.g., changes in audio characteristics of the video content), what and/or how sounds are to be provided during playback (e.g., change in volume of recorded audio, addition and/or removal of sounds, such as soundtracks, from the video content), and/or other changes to the video content. Playback of the video content based on one or more edits may include presentation of a video edit of the video content.

For example, one or more of the edits within the set of edits may define one or more trajectory of viewing directions for the video content (e.g., spherical video content). A trajectory of viewing directions may refer to a line, a path, and/or a progression that defines values of viewing directions for the video content as a function of progress through the progress length of the video content. That is, the trajectory of viewing directions may be formed by and/or define values of viewing directions to be used when the video content is viewed, such as values of viewing directions defined in a director track that includes information as to how the video content is to be presented on a display. For instance, a trajectory of viewing direction may include viewing directions from a point of view of spherical video content as the function of progress through the progress length of the spherical video content.

The viewing directions from a point of view for video content may be defined based on rotations about the point of view. The rotations about the point of view may include rotations about one or more axes running through the point of view. The axe(s) may include a yaw axis, a pitch axis, a roll axis, and/or other axes. For example, the axis may include one or more of the yaw axis 310, the pitch axis 320, and/or the roll axis 330 shown in FIG. 3. An example viewing directions 400 defined based on rotations about multiple axes is shown in FIG. 4. Other trajectories of viewing directions are contemplated. One or more edits may define other parameter values of a viewing window for the video content, such as viewing size (the extent of the visual content of the video content that is within the viewing window) and/or viewing rotation (the rotation of the viewing window).

Figure 6:
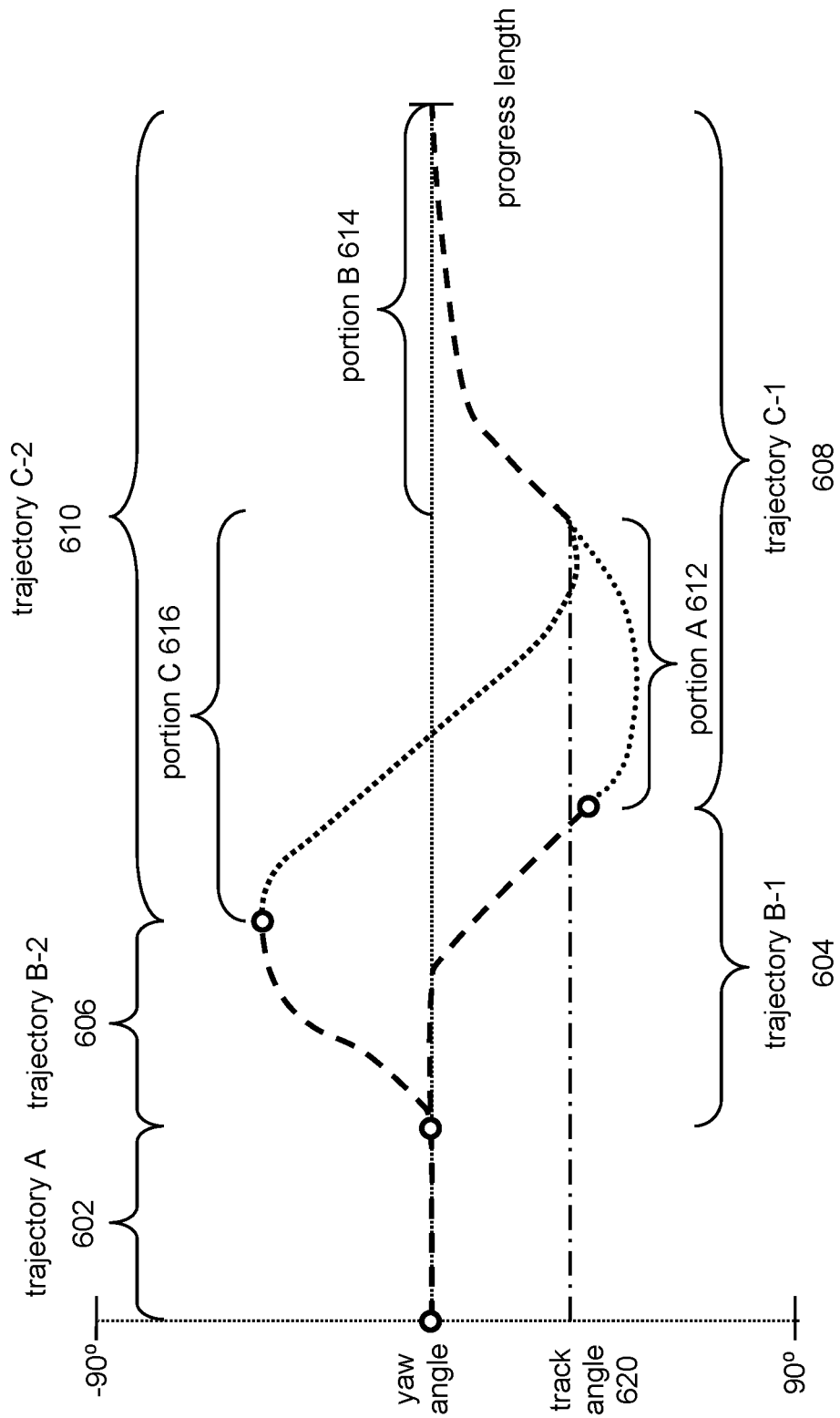
FIG. 6 illustrates example trajectories of viewing directions for spherical video content.

For example, FIG. 6 illustrates example trajectories of viewing directions for spherical video content. The trajectories shown in FIG. 6 may define yaw values (yaw angles) of viewing directions to be used for playback of the spherical video content. A set of edits may include an edit A, an edit B, and an edit C. The edit A may define a trajectory A 602 of viewing directions for the spherical video content for a duration within the progress length. The duration may include the beginning of the progress length of the spherical video content. The edit B may define a trajectory B-1 604 of viewing directions for the spherical video content for a duration within the progress length. The duration for the trajectory B-1 604 may follow the duration for the trajectory A 602 within the progress length. The edit C may define a trajectory C-1 608 of viewing directions for the spherical video content for a duration within the progress length. The duration for the trajectory C-1 608 may follow the duration for the trajectory B-1 604 within the progress length.

In some implementations, an end of a trajectory of viewing directions may be the same as a beginning of a subsequent trajectory of viewing directions. That is, one trajectory of viewing directions may start where another trajectory of viewing directions ends. For example, the trajectory A 602 of viewing directions may terminate at a particular viewing direction (0-yaw degree), and the trajectory B-1 604 of viewing directions may begin at the particular viewing direction (0-yaw degree). In some implementations, the end of a trajectory of viewing directions may be different from the beginning of a subsequent trajectory of viewing directions. That is, the start of one trajectory of viewing directions may be discontinuous with the end of the preceding trajectory of viewing directions. Other trajectories of viewing directions and other edits are contemplated.

In some implementations, one or more of the edits may be obtained based on detection of a verbal edit command during a presentation of the video content (e.g., spherical video content). A verbal edit command may refer to an order that is given through speech/voice. A verbal edit command may be general (may be given by any person) or specific to particular person(s). A verbal edit command may be spoken by a person during presentation of the video content. A verbal edit command may be recorded by an audio sensor (e.g., microphone) and detected based on analysis of the recorded audio. A verbal edit command may include a present command or a custom command. A preset command may include one or more predefined edits associated with predefined speech/voice (e.g., word(s) preset to particular edit(s)). A custom command may include one or more user-specified edits associated with user-define speech/voice (e.g., word(s) set by a user to user-defined edit(s)). A verbal edit command may define or be associated with one or more edits for the video content. That is, based on detection of a verbal edit command, the defined or associated edit(s) may be obtained. For example, a set of edits may include an edit obtained based on detection of a verbal edit command during a presentation of the video content. In some implementations, verbal edit commands may be used to change playback of the video content. That is, changes made to the video content based on the verbal edit command may not carry over to subsequent playback of the video content.

Different types of verbal edit commands may be detected. For example, detectable verbal edit commands may include a projection command, a playback speed command, a playback direction command, a marker command, and/or other commands. The projection command may specify one or more projections with which at least a portion of the video content is to be presented. For example, the projection command may specify that one or more portions (e.g., portions of progress length, portions of visual extent) of the video content should presented using a particular projection during playback. Example projections include cylindrical projection, mercator projection, Miler projection, equirectangular projection, Lambert cylindrical equal area projection, azimuthal projection, rectilinear projection, stereographic projection, fisheye projection, equisolid projection, orthographic projection, cubic projection, sinusoidal projection, transverse mercator projection, Pannini projection, architectural projection, and/or other projections.

The playback speed command may specify one or more perceived speeds with which at least a portion of the video content is to be presented. For example, the playback speed command may specify that one or more portions (e.g., portions of progress length) of the video content should be presented such that those portion(s) are presented faster or slower than the regular speed of playback. The perceived speeds with which a portion of the video content is presented may be changed based on changes how the video frames of the video content is presented. For example, the perceived speeds of video content presentation may be increased by presenting a fewer number of video frames of the video content or by presenting the video frames at a rate that is faster than the capture rate. For instance, if the video content is captured at 60 frames per second, the perceived speeds of video content presentation may be increased by 2× by presenting every other video frames at 60 frames per second or by presenting the video content at 120 frames per second. The playback speed command may include the user specifying particular speed (e.g., ½× speed, 3× speed) with which the video content is to be presented and/or the user indicating the use of particular speed pattern (e.g., speed ramp). Other changes in the perceived speeds of video content are contemplated.

The playback direction command may specify a forward direction and/or a reverse direction with which at least a portion of the video content is to be presented. A forward direction may include a direction of playback in the direction of capture. A playback direction command specifying a forward direction may cause forward playback of the video content, with video frames being presented in the order of their capture (video frames appearing as a function of progress through the progress length). A reverse direction may include a direction of playback opposite the direction of capture. A playback direction command specifying a reverse direction may cause reverse playback of the video content, with video frames being presented in reverse order of their capture (video frames appearing as a function of reverse progress through the progress length).

The marker command may specify one or more markers to be placed at one or more moments within the progress length. A marker may refer to an object that indicates a moment within the progress length. For example, a marker may include a tag or other information that identifies a point or a duration within the progress length. A marker may indicate an occurrence of a particular event of interest at the moment. The moment(s) for placement of the marker(s) may be determined based on the detection of the marker command during the presentation of the video content. For example, during presentation of the video content, a person may verbally indicate that something of interest (e.g., activity of interest, action of interest, person of interest) is captured within the video content at a moment and a marker may be paced at the moment.

Use of verbal edit commands to obtain edits to video content may make it easier for users to consume (e.g., control playback, create edits of) video content. For example, a user may be using both hands to define one or more parameters of viewing windows to be used for video content. For example, the video content may be presented on a display of a mobile device (e.g., camera, smartphone, tablet, laptop).

Figure 7:
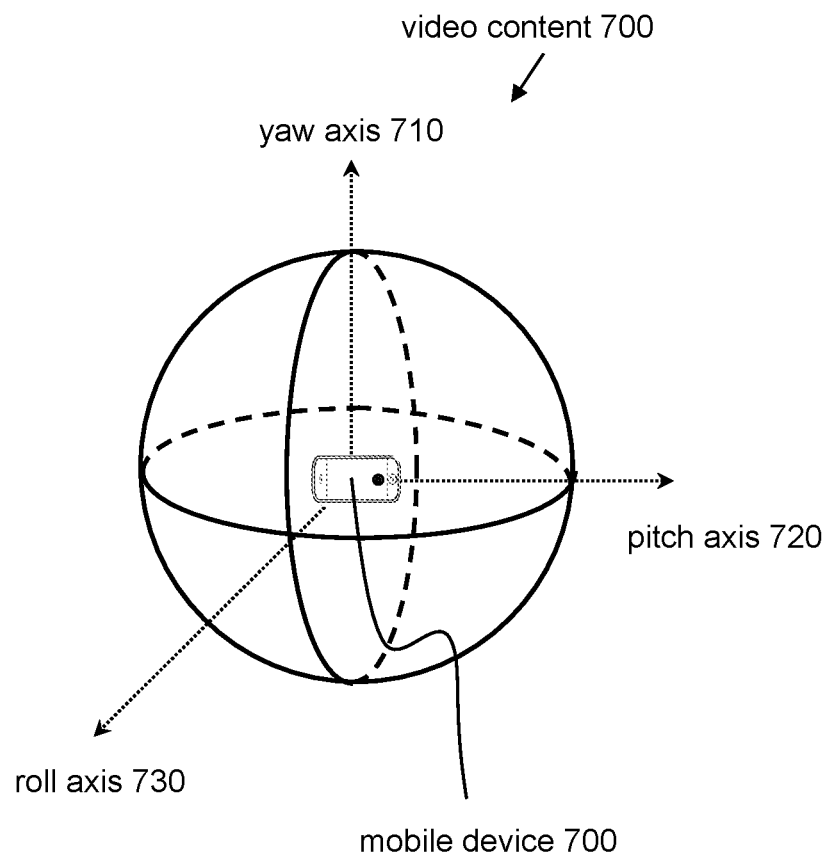
FIG. 7 illustrates an example mobile device for consuming spherical video content.

FIG. 7 illustrates a mobile device 700. The mobile device may be used to present video content 700. The mobile device 700 may include one or more motion/rotation sensors (e.g., accelerometer, gyroscope, inertial measurement unit). The mobile device 700 may include a touchscreen display. The user may define viewing directions, viewing sizes, and/or viewing rotations for the video content by interacting with the mobile device 700. For example, the user may define/change the viewing directions or viewing rotations of the video content by moving (e.g., panning, rotating) the mobile device 700. For instance, the user may rotate the mobile device 700 about a yaw axis 710, a pitch axis 720, and/or the roll axis 730 to define viewing directions and/or viewing rotations for the video content 700. As another example, the user may define viewing directions, viewing sizes, and/or viewing rotations for the video content by making one or more gestures on the touchscreen display of the mobile device.

For example, a panning gesture (e.g., tracing one or more finger across the touchscreen display) may change the viewing direction for the video content in a lateral direction (e.g., to the left, to the right, around the yaw axis 710). A rotating gesture (e.g., moving one finger in an arc while holding another finger in place on the touchscreen display) may change the viewing rotation for the video content in a clockwise or anti-clockwise direction. A stretching gesture (e.g., pushing two fingers apart on the touchscreen display) may change the viewing size for the video content by zooming in on the portion of the video content in the middle of the stretching gesture. A pinching gesture (e.g., pulling two fingers together on the touchscreen display) may change the viewing size for the video content by zooming out of the video content (e.g., zooming out from the portion of the video content in the middle of the pinching gesture).

Requiring users to physically interact with a device (e.g., the mobile device 700) to provide edits may make it difficult for users to provide all the edits desired for the video content. For example, if a user is rotating the mobile device 700 to determine viewing directions or the video content, it may be difficult for the user to also interact with a button or the touchscreen display to add other edits. The user may wish to keep both hands on the mobile device 700 to keep the rotation steady. Rather than physically interacting the mobile device 700, the user may use the verbal edit commands to add edits. For example, while the user is rotating the mobile device 700 to determine viewing directions or the video content, the user may change the projection for the video content, change the viewing size for the video content, change perceived speed of playback for the video content, add visual effects to the video content, change audio characteristics of the video content, add soundtrack to the video content, and/or otherwise edit the video content by using verbal edit commands.

Figure 8A:
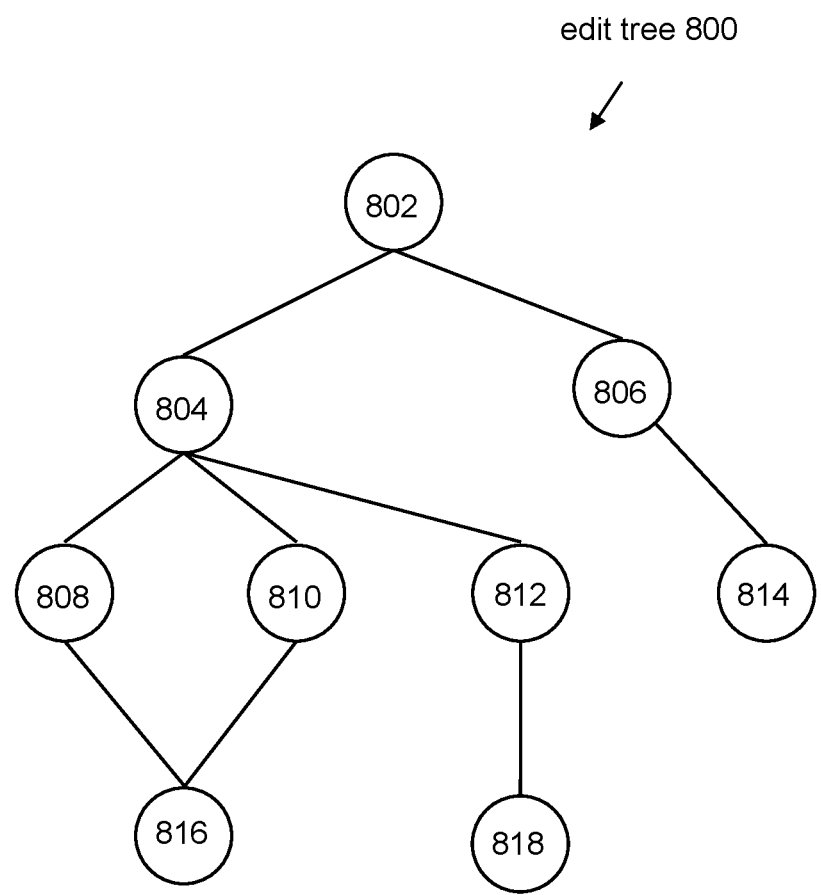
FIG. 8A illustrates an example edit tree.

Referring back to FIG. 1, the edit tree component 106 may be configured to generate an edit tree for the video content (e.g., spherical video content) based on the set(s) of edits and/or other information. An edit tree may provide a graphical representation of the edits for the video content, with nodes corresponding to edits and edges connecting the nodes representing connections between the edits. For example, FIG. 8A illustrates an example edit tree 800. The edit tree 800 may include nodes 802, 804, 806, 808, 810, 812, 814, 816, 818. Individual nodes 802, 804, 806, 808, 810, 812, 814, 816, 818 may correspond to one or more edits within the set(s) of edits. Different nodes 802, 804, 806, 808, 810, 812, 814, 816, 818 may correspond to different edits with the set(s) of edits. The edges (lines) connecting different nodes 802, 804, 806, 808, 810, 812, 814, 816, 818 represent connection between the edits corresponding to the nodes 802, 804, 806, 808, 810, 812, 814, 816, 818. A node within an edit tree may correspond to the beginning of the video content and/or the beginning of edits for the video content. A node within an edit tree may correspond to the end of the video content and/or the end of edits for the video content.

An edit tree may be used to provide hierarchical editing options for video content (e.g., spherical video content). Hierarchical editing options may refer to options for editing video content that utilizes ordering of edits for the video content. The edit tree may provide a graphical representation of the edits for the video content, with the edits ordered within the edit tree. The ordering of the edits within the edit tree may be indicated by placement of the nodes within the edit tree and/or the edges between the nodes. For example, an edit corresponding to the node 802 may be applied to the video content before an edit corresponding to the node 804. The edits corresponding to the nodes 808, 810 may be applied in parallel to the video content after the edit correspond to the node 804. The edit tree may facilitate adding, removing, modifying, arranging, and/or other usage of edits to the video content. In some implementations, the ordering of the edits within the edit tree may be indicated by directionality of edges within the edit tree.

For example, an edit tree may be accessible through one or more user interfaces. A user interface may refer to an interface presented on a display of a device. A user interface may present information that facilitates editing of video content. For example, the edit tree 800 (or some variable of the edit tree 800) may be presented within an interface of a video editing application. The presentation of the edit tree 800 may allow a user to determine which edits have been selected for the video content, how the edits are to be applied to the video content, and/or other information about the edits. A user may select a node (e.g., click on a node, hover over a node) to see information on the corresponding edit. Thus, the edit tree 800 may track edits to the video content (e.g., decision points for spherical video content).

The user interface may enable one or more changes to the nodes and/or edges within the edit tree 800. For example, the user interface may enable one or more changes to the nodes 802, 804, 806, 808, 810, 812, 814, 816, 818 and/or edges connecting the nodes 802, 804, 806, 808, 810, 812, 814, 816, 818. Changes to a node may include changes to an edit corresponding to the node, removal of the node, or other changes to the node. Changes to an edge may include changes in which nodes are connected by the edge, removal of the edit (e.g., removal of all edges to a node within the edit tree), or other changes to the edge. A user may add a new node to the edit tree 800 to add a new edit to the video content. A user may add a new edge to the edit tree 800 to change how the edits are applied.

For example, a node 804 may correspond to a particular trajectory of viewing directions and a user may interact with the node 804 to change the trajectory of viewing directions defined by the node 804. The user may remove the node 804 to remove the trajectory of viewing directions defined by the node 804 from a video edit of the video content. The user may change one or more edges of the node 804 to change how different edits are applied to the video content. For example, the nodes 810, 812 may represent different edits to the video content. Whether the edits corresponding to one or both of the nodes 810, 812 are applied to the video content following the edits corresponding to the node 804 may depend on whether the nodes 810, 812 are connected to the node 804 via edges. For example, the node 804 may initially be connected to the node 810. The user may remove the edge between the nodes 804, 810 and add a new edge between the nodes 804, 812. Such a change in the edit tree 800 may result in the video content being edited with an edit corresponding to the node 804, followed by an edit corresponding to the node 812 rather than 810. The removal of the edge between the nodes 804, 810 may also remove other edits following the node 810, such as an edit corresponding to the node 816.

In some implementations, an edit tree may track different edit options for the video content. An edit option may refer to an edit that may be selected by a user for the video content. For example, different edit options may be presented to a user (via the user interface) for selection, and the edit tree may track the selected edit option(s) and/or the unselected edit option(s). For example, a set of edit options including different edit options for different types of video editing (e.g., calm video edits, dynamic video edits, video edit accompanied by soundtrack, video edits including or not including speed ramps) may be provided to a user for selection. Based on the user's selection of edit options, different video edits (e.g., different two-dimensional cuts of spherical video content) may be provided for viewing and/or inclusion in a video summary.

In some implementations, one or more of the edit options presented to a user may include preset edit options. A preset edit options may refer to an previously determined and/or configured edit available for use with video content. For example, rather than having a user manually set viewing directions for the video content, the user may select a preset edit option defining a particular changes in viewing directions to include a pan of the viewing window in a preset way. In some implementation, a preset edit option may be determined based on analysis of edits previously made by one or more users. For instance, based on a user tending to making a particular edit to video content, the particular edit may be provided to the user as a preset edit option. Based on a user tending to following a particular edit with another edit, the other edit may be provided to the user as a preset edit option based on the user making the particular edit.

In some implementations, one or more of the edit options may be presented with context. Context may refer to circumstances relating to the video content, information relating to a portion of the video content to be changed by the selected edit option, and/or information relating to portion(s) of the video content surrounding or adjacent to the portion to be changed by the selected edit option. For example, an edit option may include a trajectory of viewing directions that follows an object within the video content, and the edit option may be presented with information on what object may be tracked within the video content based on selection of the edit option. An edit option may include changes in perceived speed of playback (e.g., adding a speed ramp) and the edit option may be presented with information on what activity within the video content may be affected by the speed ramp. Presentation of other context are contemplated.

In some implementations, one or more sets of edit options for the video content may be provided following a node in the edit tree. For example, the nodes 808, 808 may be provided as a set of edit options following the node 804. That is, a set of edit options provided for selection by a user (after making/selecting the edit corresponding to the node 804) may include an edit corresponding to a node 808 and an edit corresponding to a node 810. The edits to the video content may change based on the user's selection or non-selection of the edits corresponding to the nodes 808, 810. For example, the node 804 may correspond to an edit defining a trajectory of viewing directions for a duration of video content, and the nodes 808, 810 may correspond to edits defining different trajectories of viewing direction for one or more following durations. The durations impacted by the edits corresponding to the nodes 808, 810 may be the same or different.

For instance, referring to FIG. 6, the node 804 may correspond to an edit defining the trajectory A 602, the node 808 may correspond to an edit defining the trajectory B-1 604, and the node 810 may correspond to an edit defining the trajectory B-2 606. The user may select among the edits corresponding to the nodes 808, 810 to use the trajectory B-1 604 or the trajectory B-2 606 after the trajectory A 602.

One or more edits corresponding to one or more nodes may be automatically changed based on other change(s) in the edit tree, such as based on one or more change to a node and/or an edge in the edit tree. For example, referring to FIGS. 6 and 8A, a user may have selected edits defining the trajectory A 602 (corresponding to the node 804), the trajectory B-1 604 (corresponding to the node 808), and the trajectory C-1 608 (corresponding to the node 816). A change to the edit tree 800 may include a change to the trajectory of viewing directions defined by the node 808 or a change from usage of the trajectory of viewing directions defined by the node 808 to the trajectory of viewing directions defined by the node 810.

For example, the trajectories of viewing directions selected by the user may change from the trajectory B-1 604 to the trajectory B-2 606. The trajectory B-1 604 and the trajectory B-2 606 may start from the same viewing direction (zero-degree yaw angle) and terminate at different viewing directions (the trajectory B-1 terminating at a negative yaw angle and the trajectory B-2 terminating at a positive yaw angle). Based on the trajectory B-2 606 terminating at a different viewing direction than the trajectory B01 604, the trajectory C-1 608 (corresponding to the node 816) may be changed to the trajectory C-2 610 to include different viewing directions from the trajectory C-1 608. The trajectory C-2 610 may begin at the terminating viewing direction of the trajectory B-2 606.

The trajectory B-1 604 and the trajectory B-2 606 may cover different durations of the progress length of the video content. The trajectory B-1 604 and the trajectory B-2 606 may start from the same point in the progress length (following the duration covered by the trajectory A 602) and terminate at different points in the progress length, with the trajectory B-2 606 covering shorter duration than the trajectory B-1 604. Based on the trajectory B-2 606 terminating earlier in the progress length than the trajectory B-1 604, the trajectory C-1 608 (corresponding to the node 816) may be changed to the trajectory C-2 610 to include different duration (e.g., longer duration) of the progress length.

In some implementations, automatic changes in an edit tree may preserve one or more aspects of edits corresponding to one or more nodes. For example, the trajectory C-1 608 may cover a portion A 612 and a portion B 614 of the progress length. During the portion B 614, the trajectory C-1 608 may be following a target within the video content. The trajectory C-1 608 may begin following the target from a particular viewing direction (e.g., defined by track angle 620). The trajectory C-1 608 may be changed to the trajectory C-2 610 based on the terminating viewing direction of the trajectory B-2 606 and the particular viewing direction from which the target is tracked (track angle 620) to include a path from the terminating viewing direction of the trajectory B-2 606 to the particular viewing direction (track angle 620). In FIG. 6, this path may cover a portion C 616 of the progress length. The viewing directions of the trajectory C-1 608 covering the portion B 614 may be preserved in the trajectory C-2 610. That is, the portions of the trajectory C-1 608 and the trajectory C-2 610 covering the portion B 614 of the progress length may be the same/preserved after automatic changes in the edit tree.

In some implementations, an edit tree may indicate directionality of edits for video content. The directionality of edits may indicate an order in which the edits corresponding to different nodes are applied to the video content. The directionality of edits may be determined based on an order in which a user selected the edits, inserted edit(s) between existing edits, removed existing edit(s), and/or modified connections between the edits (e.g., changed edges between nodes). In some implementations, a user may interact with the edit tree to define the directionality of edits. For example, a user may draw a path through the edit tree to indicate which nodes/edits are to be used and the directionality of the selected nodes/edits.

Figure 8B:
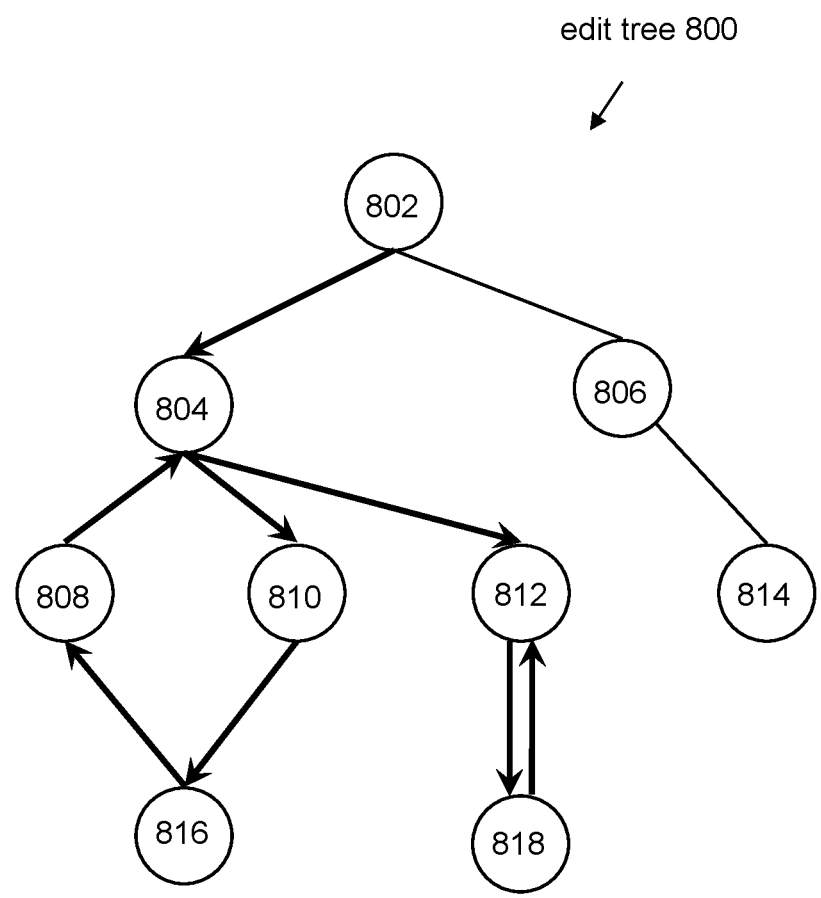
FIG. 8B illustrates an example edit tree.

For example, FIG. 8B illustrates the edit tree 800 with directionality of edits indicated by direction of edges between the nodes 802, 804, 806, 808, 810, 812, 814, 816, 818. The directionality of edits shown in FIG. 8B may indicate the application of edits corresponding to the nodes in the following order: the node 802, the node 804, the node 810, the node 816, reverse of the node 816, reverse of the node 808, the node 812, the node 818, and reverse of the node 818. For example, the nodes 802, 804, 806, 808, 810, 812, 814, 816, 818 may correspond to edits defining different trajectories of viewing directions for the video content and the application of the edits corresponding to the different nodes as indicated by the directionality of edits may determine how those trajectory of viewing directions are used to create one or more video edits.

For instance, the downward direction of the edges may indicate usage of the corresponding trajectory with a forward playback of the video content and the upward direction of the edges may indicate usage of the corresponding trajectory with a reverse playback of the video content. For example, the downward direction of the edges between the nodes 804, 810, 816 may indicate that the trajectory of viewing directions defined by the edits corresponding to the nodes 810, 816 are used with a forward playback of the video content. The upward direction of the edges between the nodes 816, 808, 804 may indicate that the trajectory of viewing directions defined by the edits corresponding to the nodes 816, 808 are used with a reverse playback of the video content. In other words, an edit of the video content based on the edit tree 800 shown in FIG. 8B may include (1) a forward playback of the video content for a duration in which the viewing direction changes based on the trajectories of viewing directions corresponding to the nodes 810, 816, and (2) a reverse playback of the video content for the duration in which the viewing direction changes based on reverse of the trajectories of viewing directions corresponding to the nodes 816, 808, with the reverse playback ending at the terminating viewing direction of the trajectory of viewing directions corresponding to the node 804.

This forward and reverse playback of the same duration of the video content may be followed by a forward playback of the video content in which the viewing direction changes based on the trajectories of viewing direction corresponding to the nodes 812, 818, and then a reverse playback of the video content in which the viewing direction changes based on reverse of the trajectory of viewing directions corresponding to the node 818. Other usages of directionalities of edges between nodes within an edit tree are contemplated.

Figure 8C:
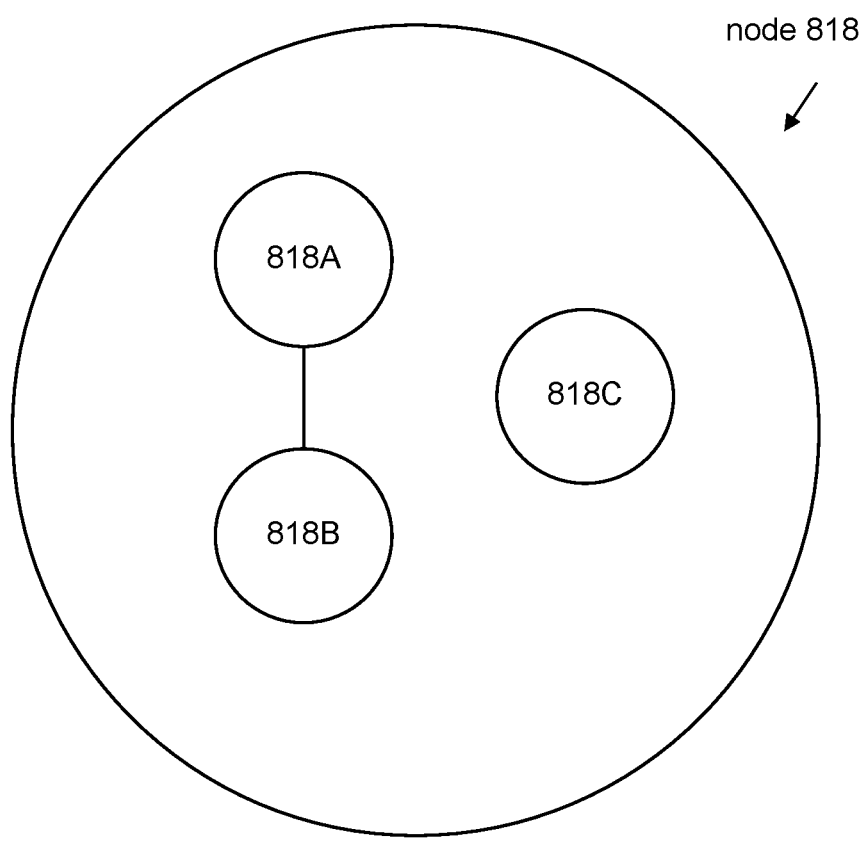
FIG. 8C illustrates an example node.

Nodes within an edit tree may represent a single edit or multiple edits. For example, FIG. 8C illustrates the node 818. A view of the node 818 that is the same as or similar to the view shown in FIG. 8C may be presented based on a user's selection (e.g., clicking on a node, hovering over a node) of the node 818. The node 818 may include three edits for the video content, represented by sub-nodes 818A, 818B, 818C. The edit corresponding to the sub-node 818A may applied before the edit corresponding to the sub-node 818B. The connection between the sub-nodes 818A, 818B may be shown by the edges between the sub-nodes 818A, 818B. The edit corresponding to the sub-node 818C may be applied during application of the edits corresponding to the sub-nodes 818A, 818B. That is, the edit corresponding to the sub-node 818C may be applied for the entire edit corresponding to the node 818. For example, the sub-nodes 818A, 818B may correspond to edits defining two sub-trajectories of viewing directions while the sub-node 818C may correspond to an edit defining a projection to be used during the usage of the trajectory of viewing directions (including the two sub-trajectories of viewing directions).

Edits may be combined into a single node based on one or more commonalities. For example, the sub-nodes 818A, 818B may be combined into the node 818 based on application of the edit corresponding to the sub-node 818C for the durations covered by the sub-nodes 818A, 818B. In some implementations, the nodes may be grouped together based on user input/selection. Other combinations of edits into a single node are contemplated.

In some implementations, the presentation of an edit tree may be changed. For example, based on a user input/selection to see potential edit options for video content, the view of the edit tree 800 shown in FIG. 8A may be shown. Based on a user input/selection to see edits selected for video content and the directionality of the edits, the view of the edit tree 800 shown in FIG. 8B may be shown. The presentation of the edit tree may be changed based on filtering of edits. For example, based on a user input/selection to see only edits relating to viewing directions, nodes relating to other edits (e.g., sound edits) may be removed from the edit tree or may be presented differently from nodes relating to viewing directions. For example, nodes relating to viewing directions may be shown with different color, shape, icon, and/or emphasis than nodes relating to other edits. Such changes in the presentation of the edit tree may enable users to quickly determine the types of edits selected for video content and the relationship between the different types of edits.

The video edit component 108 may be configured to generate one or more video edits of the video content (e.g., spherical video content) based on the edit tree and/or other information. A video edit may refer to a particular arrangement and/or manipulation of one or more portions (e.g., video clips) of the video content. In some implementations, a video edit may provide a summary and/or an overview of the video content. The video edit component 108 may apply the edit(s) within the edit tree to the video content to generate the video edit(s). The video edit component 108 may generate additional video edit(s) or change previously generated video edit(s) based on changes to the edit tree. For example, the video edit component 108 may generate additional video edit(s) or change previously generated video edit(s) based on changes to one or more nodes and/or one or more edges within the edit tree.

A video edit may be generated as encoded video content and/or instructions for rendering the video edit. For example, the video edit may be generated as an encoded version of a particular video clip, and the video clip may be opened in a video player for presentation. The video edit may be generated as instructions for presenting video content, such as instructions identifying arrangements and/or manipulations of one or more portions of video content included in the video edit. For example, the video edit may be generated as information defining a director track that includes information as to which portions (portions of progress length, portions of visual content) of the video content are included in the video edit, the order in which the portions are to the presented on playback, and the edits to be applied to the different portions. A video player may use the director track to retrieve the portions of the video content identified in the video edit for presentation, arrangement, and/or editing when the video edit is opened/to be presented.

Video edit information defining the video edit (e.g., encoded video content, director track) may be stored in one or more storage media. For example, the video edit information may be stored in the electronic storage 13, remote storage locations (storage media located at/accessible through a server), and/or other locations. In some implementations, the video edit information may be stored through one or more intermediary devices. For example, the processor 11 may be located within a computing device without a connection to the storage device (e.g., the computing device lacks WiFi/cellular connection to the storage device). The video edit information may be stored through another device that has the necessary connection (e.g., the computing device using a WiFi/cellular connection of a paired mobile device, such as a smartphone, tablet, laptop, to store information in one or more storage media). Other storage locations for and storage of the video edit information are contemplated.

While the description herein may be directed to video content, one or more other implementations of the system/method described herein may be configured for other types media content. Other types of media content may include one or more of audio content (e.g., music, podcasts, audio books, and/or other audio content), multimedia presentations, images, slideshows, visual content (one or more images and/or videos), and/or other media content.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
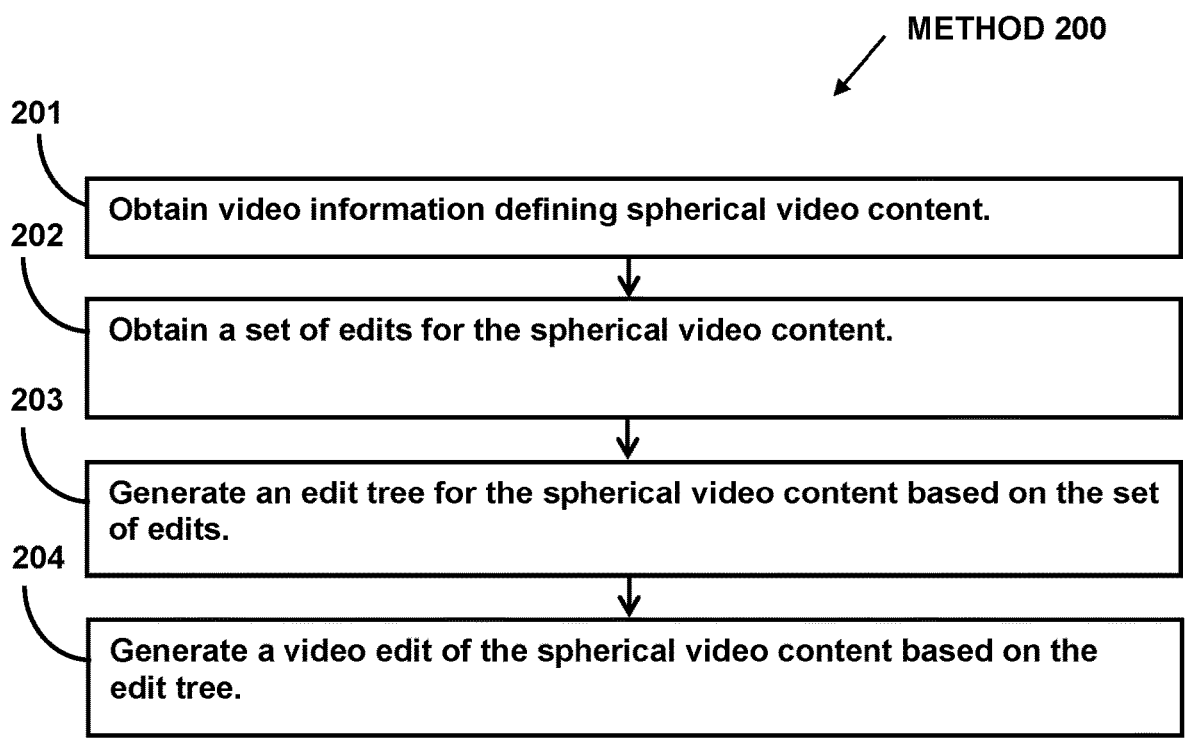
FIG. 2 illustrates a method for providing hierarchical editing options for spherical videos.

FIG. 2 illustrates method 200 for editing videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operation of method 200.

Referring to FIG. 2 and method 200, at operation 201, video information defining spherical video content may be obtained. The spherical video content may have a progress length. The spherical video content include spherical video frames that define visual content viewable from a point of view as a function of progress through the progress length of the spherical video content. In some implementation, operation 201 may be performed by a processor component the same as or similar to the video information component 102 (Shown in FIG. 1 and described herein).

At operation 202, a set of edits for the spherical video content may be obtained. The set of edits may include a first edit and a second edit. The second edit may follow the first edit in the set of edits. In some implementations, operation 202 may be performed by a processor component the same as or similar to the edit component 104 (Shown in FIG. 1 and described herein).

At operation 203, an edit tree for the spherical video content may be generated based on the set of edits. The edit tree may include a first node corresponding to the first edit, a second node corresponding to the second edit, and an edge connecting the first node and the second node. In some implementations, operation 203 may be performed by a processor component the same as or similar to the edit tree component 106 (Shown in FIG. 1 and described herein).

At operation 204, a video edit of the spherical video content may be generated based on the edit tree. In some implementations, operation 204 may be performed by a processor component the same as or similar to the video edit component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that provides hierarchical editing options for spherical videos, the system comprising:
    one or more physical processors configured by machine-readable instructions to:
       obtain video information defining spherical video content, the spherical video content having a progress length and including spherical video frames that define visual content viewable from a point of view as a function of progress through the progress length;
       obtain a set of edits for the spherical video content, the set of edits including a first edit and a second edit, the second edit following the first edit in the set of edits;
       generate an edit tree for the spherical video content based on the set of edits, the edit tree including a first node corresponding to the first edit, a second node corresponding to the second edit, and an edge connecting the first node and the second node; and
       generate a video edit of the spherical video content based on the edit tree.

2. The system of claim 1, wherein:
    the first edit defines a first trajectory of viewing directions for the spherical video content for a first duration within the progress length;
    the second edit defines a second trajectory of viewing directions for the spherical video content for a second duration within the progress length, the second duration following the first duration within the progress length;
    the first trajectory of viewing directions terminates at a first viewing direction; and
    the second trajectory of viewing directions begin at the first viewing direction.

3. The system of claim 2, wherein based on a change to the first trajectory of viewing direction to terminate at a second viewing direction, the second trajectory of viewing directions is changed based on the second viewing direction.

4. The system of claim 3, wherein the second trajectory of viewing directions is changed based on the second viewing direction to begin at the second viewing direction.

5. The system of claim 3, wherein:
    the second trajectory of viewing directions includes a portion in which the second trajectory of viewing direction is following a target within the spherical video content from a third viewing direction; and
    the second trajectory of viewing directions is changed based on the second viewing direction and the third viewing direction to include a path from the second viewing direction to the third viewing direction.

6. The system of claim 2, wherein the one or more physical processors are further configured by the machine-readable instructions to provide a set of edit options for the spherical video content following the second node, the set of edit options including a first trajectory option and a second trajectory option, the first trajectory option defining a third trajectory of viewing directions for the spherical video content for a third duration within the progress length, the second trajectory option defining a fourth trajectory of viewing directions for the spherical video content for the third duration within the progress length, the third trajectory of viewing directions different from the fourth trajectory of viewing direction, the third duration following the second duration within the progress length.

7. The system of claim 1, where the edit tree is accessible through a user interface, the user interface enabling one or more changes to the first node, the second node, and/or the edge connecting the first node and the second node.

8. The system of claim 1, wherein the set of edits includes a third edit, the third edit obtained based on detection of a verbal edit command during a presentation of the spherical video content.

9. The system of claim 8, wherein the verbal edit command includes a projection command, the projection command specifying a projection with which at least a portion of the spherical video content is to be presented.

10. The system of claim 8, wherein the verbal edit command includes a playback speed command, the playback speed command specifying a perceived speed with which at least a portion of the spherical video content is to be presented.

11. The system of claim 8, wherein the verbal edit command includes a playback direction command, the playback direction command specifying a forward direction or a reverse direction with which at least a portion of the spherical video content is to be presented.

12. The system of claim 8, wherein the verbal edit command includes a marker command, the marker command specifying a marker to be placed at a moment within the progress length, the moment determined based on the detection of the marker command during the presentation of the spherical video content.

13. A method for providing hierarchical editing options for spherical videos, the method performed by a computing system including one or more processors, the method comprising:
obtaining, by the computing system, video information defining spherical video content, the spherical video content having a progress length and including spherical video frames that define visual content viewable from a point of view as a function of progress through the progress length;
obtaining, by the computing system, a set of edits for the spherical video content, the set of edits including a first edit and a second edit, the second edit following the first edit in the set of edits;
generating, by the computing system, an edit tree for the spherical video content based on the set of edits, the edit tree including a first node corresponding to the first edit, a second node corresponding to the second edit, and an edge connecting the first node and the second node; and
generating, by the computing system, a video edit of the spherical video content based on the edit tree.

14. The method of claim 13, wherein:
the first edit defines a first trajectory of viewing directions for the spherical video content for a first duration within the progress length;
the second edit defines a second trajectory of viewing directions for the spherical video content for a second duration within the progress length, the second duration following the first duration within the progress length;
the first trajectory of viewing directions terminates at a first viewing direction; and
the second trajectory of viewing directions begin at the first viewing direction.

15. The method of claim 14, wherein based on a change to the first trajectory of viewing direction to terminate at a second viewing direction, the second trajectory of viewing directions is changed based on the second viewing direction.

16. The method of claim 15, wherein the second trajectory of viewing directions is changed based on the second viewing direction to begin at the second viewing direction.

17. The method of claim 15, wherein:
the second trajectory of viewing directions includes a portion in which the second trajectory of viewing direction is following a target within the spherical video content from a third viewing direction; and
the second trajectory of viewing directions is changed based on the second viewing direction and the third viewing direction to include a path from the second viewing direction to the third viewing direction.

18. The method of claim 14, further comprising providing, by the computing system, a set of edit options for the spherical video content following the second node, the set of edit options including a first trajectory option and a second trajectory option, the first trajectory option defining a third trajectory of viewing directions for the spherical video content for a third duration within the progress length, the second trajectory option defining a fourth trajectory of viewing directions for the spherical video content for the third duration within the progress length, the third trajectory of viewing directions different from the fourth trajectory of viewing direction, the third duration following the second duration within the progress length.

19. The method of claim 13, where the edit tree is accessible through a user interface, the user interface enabling one or more changes to the first node, the second node, and/or the edge connecting the first node and the second node.

20. The method of claim 13, wherein the set of edits includes a third edit, the third edit obtained based on detection of a verbal edit command during a presentation of the spherical video content.

* * * * *